O. R. HUNT.
SPRING STRUCTURE.
APPLICATION FILED JULY 3, 1918.
1,343,565.
Patented June 15, 1920.
2 SHEETS—SHEET 2.
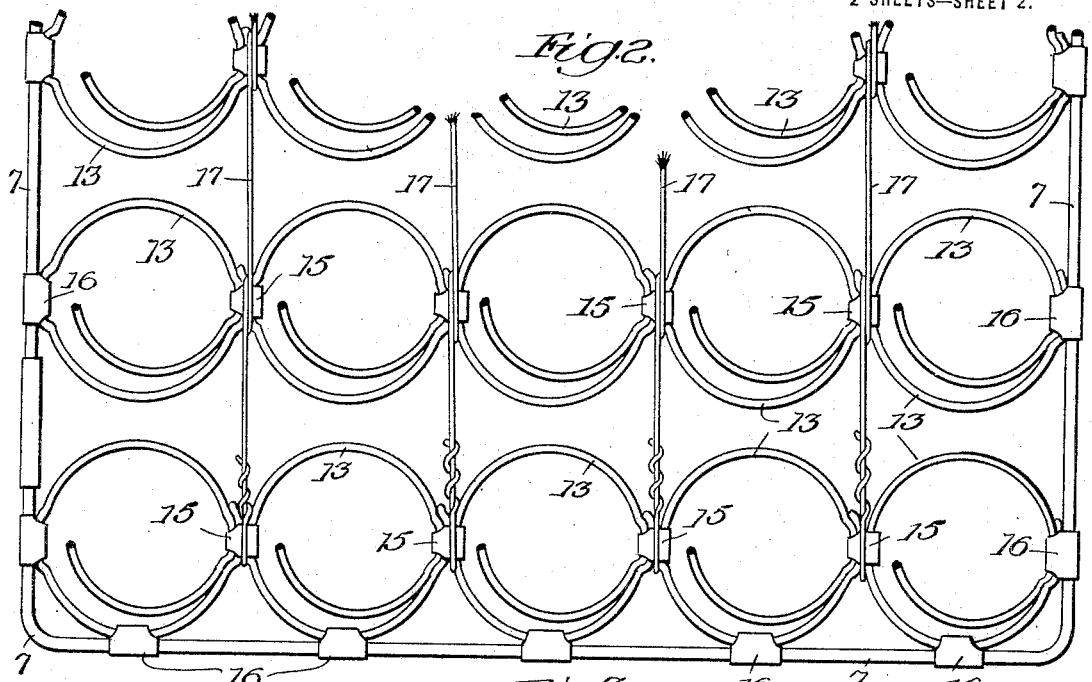
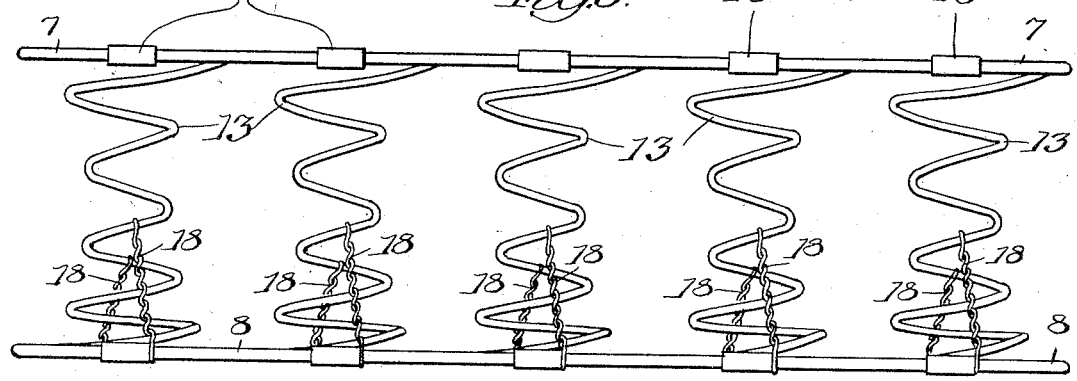
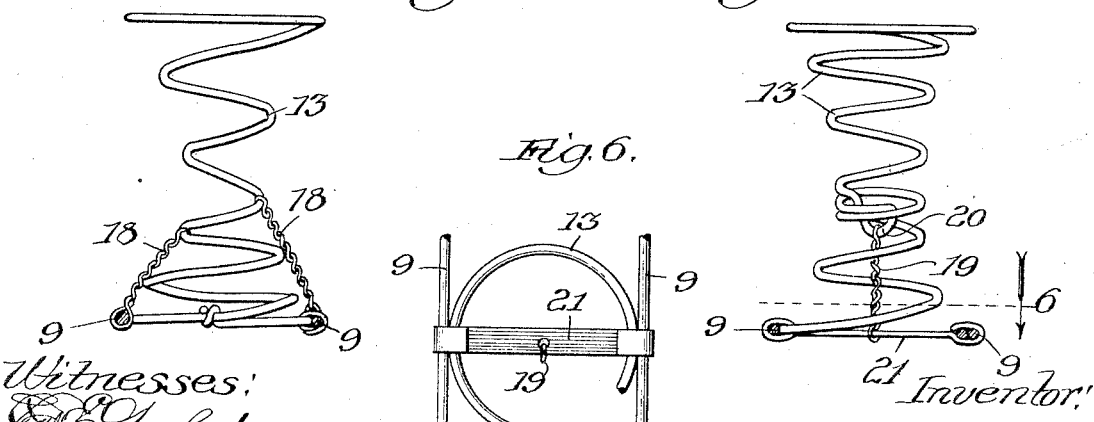
Witnesses:
Inventor:
Ozello R. Hunt,
By Dyrenforth, Lee, Chritton & Wiles,
Att'ys

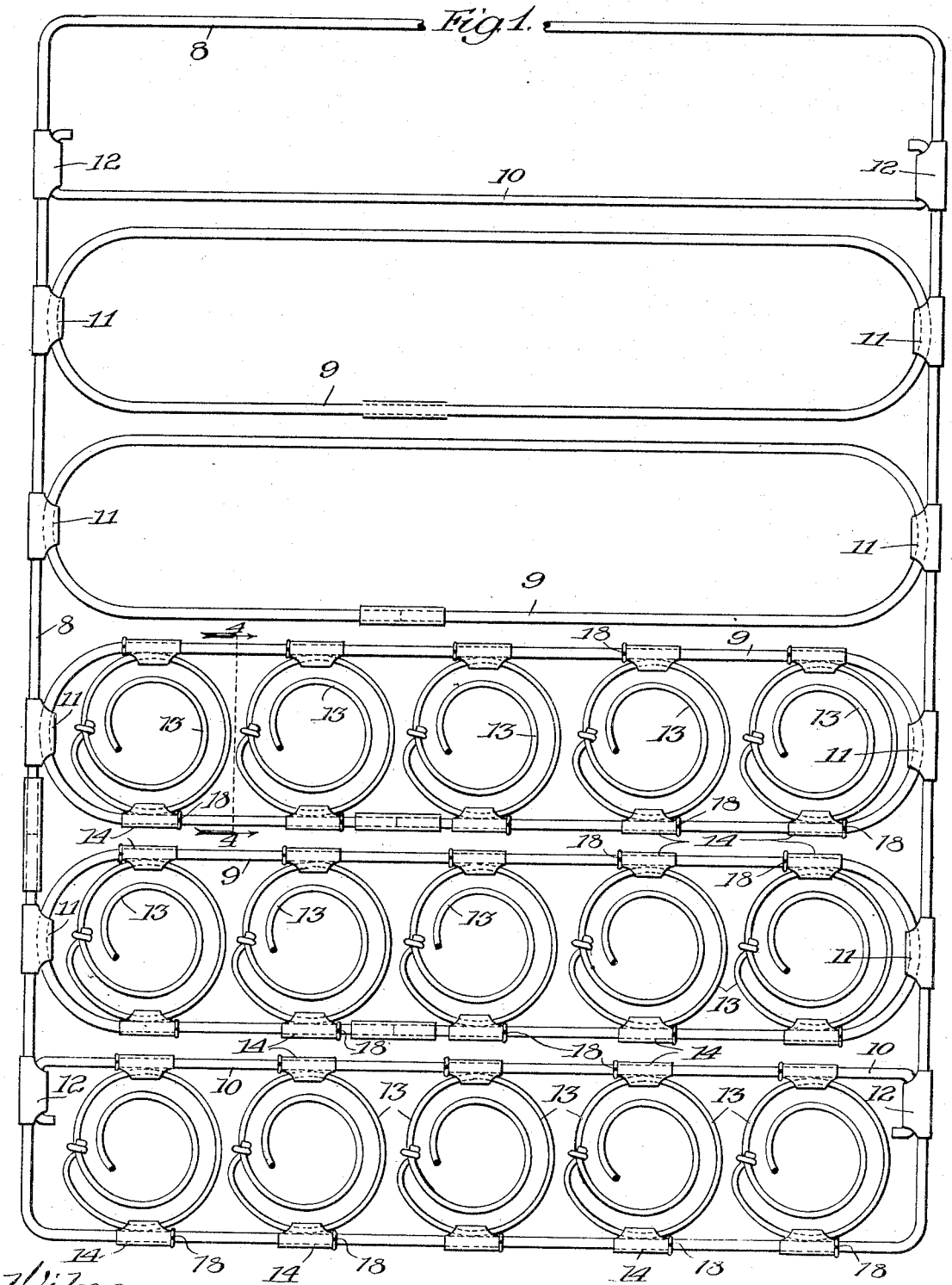

UNITED STATES PATENT OFFICE.

OZELLO R. HUNT, OF CHICAGO, ILLINOIS, ASSIGNOR, BY DIRECT AND MESNE ASSIGNMENTS, TO CUSHION SPRING ENGINEERING CORPORATION, OF CHICAGO, ILLINOIS, A CORPORATION OF ILLINOIS.

SPRING STRUCTURE.

1,343,565.   Specification of Letters Patent.   Patented June 15, 1920.

Application filed July 3, 1918. Serial No. 243,098.

*To all whom it may concern:*

Be it known that I, OZELLO R. HUNT, a citizen of the United States, residing at Chicago, in the county of Cook and State of Illinois have invented a new and useful Improvement in Spring Structures, of which the following is a specification.

My invention relates, more particularly, to cushions, or the like, formed of coiled springs grouped together to afford to the cushion the desired cushioning effect, my improvement having been devised for use, more particularly, though not exclusively, in cushion structures forming the seats of vehicles, more particularly, automobiles.

It is desirable in spring-structures for vehicles, more particularly, to provide a relatively soft action for absorbing the relatively light jars to which the vehicle is subjected in use, and also provide for the absorbing of the relatively heavy jars, without producing a bouncing or rebounding action. It may be also stated that it is desirable to use relatively light coiled springs in structures of this kind, as the danger of the springs becoming set and thereby producing sagging of the cushion structure, after the same has been used for a while, is reduced to the minimum.

My primary object is to provide a novel, simple, and inexpensive construction of cushion structure which shall employ relatively light wire only for the springs; shall present the relatively soft action of a light spring and present means for absorbing relatively heavy jars, all without producing objectionable rebound, the structure acting as a shock absorber.

Referring to the accompanying drawings:

Figure 1 is a plan view of the lower part of the spring structure, as for example an automobile-seat, constructed in accordance with my invention, parts of the springs being broken away or in section. Fig. 2 is a plan view of an end portion of the structure with certain parts of the springs omitted. Fig. 3 is a view in side elevation of the spring structure. Fig. 4 is an enlarged section taken at the line 4—4 on Fig. 1 and viewed in the direction of the arrows. Fig. 5 is a view similar to Fig. 4 of a modification of the structure shown therein; and Fig. 6, a section taken at the line 6 on Fig. 5 and viewed in the direction of the arrow.

I have chosen to illustrate my invention in a particular form of cushion-seat structure, as illustrated, wherein rectangular frames 7 and 8 are provided at the top and bottom, respectively, of the structure, these elements being made of wire or any other suitable material. At intervals and extending across the bottom frame 8, are supplemental frames 9 and 10, which are clipped to the frame 8 as indicated at 11 and 12. The framework thus provided forms a supporting frame for coiled springs, represented at 13, and preferably of the hour-glass type, these springs being grouped together as illustrated, with a series of springs extending into each supplemental framework provided, and clipped thereto, as indicated at 14, by any suitable means. The springs are omitted in the portion of the structure shown in the upper part of Fig. 1, but it will be understood that this part of the structure will be supplied with springs as in the case of the part illustrated in the lower part of this figure. The upper ends of the springs are clipped together, as indicated at 15 and at the portions thereof extending adjacent the frame 7 are clipped to the latter, as represented at 16, and by preference ties, such as the cord represented at 17 extending crosswise of the series of springs, connect them together, as represented, the cord passing around the clip devices 14, as shown.

In accordance with my invention, the springs 13 are constructed of relatively light spring wire, and in the assembly of the springs with the frameworks referred to, the lower portion of each spring, preferably the lower half of each thereof, is placed under an initial compression, the degree of which will depend upon the weight the spring structure is to carry, the idea being to provide the springs in such normal condition that the upper portions only of the springs will respond to relatively light jars and the lower portions of these springs will act only in case of heavier jars.

In the accompanying drawings, I have shown two of the ways in which these springs may be conditioned, as stated. Thus in Figs. 1 to 4 inclusive, flexible elements, such as relatively small chains represented at 18, connect, at their upper ends, with each spring 13 between the ends of the latter, as represented, and at their lower ends connect with the relatively stationary framework of the spring structure which, in the construction illustrated, is formed of the frame 8 and the members 9 and 10. By this arrangement, the lower part of each of the coiled springs 13 is placed initially under the desired compression and while the lower parts of these springs are free to be further compressed when force exerted downwardly against them is sufficient to overcome their spring tension, they are held at all times under compression, the elements 18 serving as checks and by exerting resistance at opposite sides of each spring, to their tendency to return to a condition in which all parts of the springs are in uniform condition, operating to hold each spring in alined condition.

In the arrangement shown in Figs. 5 and 6, a single device is employed for holding each spring in the condition above referred to. The device referred to, and represented at 19, may be a chain or any other suitable means, extending centrally in the spring 13 and anchored at its lower end to a relatively stationary part of the structure. As shown, a portion of the spring 13 is provided with the downward deflection 20 for attachment to the upper end of the member 19, the lower end of this member connecting with a cross piece 21 connected with the relatively stationary lower frame of the spring structure, and with which the spring 13 is connected at its lower end. In this construction, the lower portion of each spring is held at all times in compressed condition and in such a way as to preserve the alinement of the parts of each spring, for the purpose above explained.

It will be readily understood from the foregoing that by providing a cushion structure in accordance with my invention, the upper zone, so to speak, of the coiled spring portion of the structure, presents a relatively soft action for absorbing relatively light jars and the lower zone of the coiled spring structure operates only in case of relatively heavy jars, and by reason of the checking action exerted by the connectors 18 or 19, as the case may be, objectionable rebound of the springs is avoided, the action being similar to that of a shock absorber.

While I have illustrated and described certain constructions in which my invention may be embodied, I do not wish to be understood as intending to limit it thereto, as the same may be variously modified and altered without departing from the spirit of my invention, it being my intention to claim my invention as fully and completely as the prior state of the art will permit.

What I claim as new and desire to secure by Letters Patent—

1. In a spring-structure, the combination of a group of spiral springs, and means, individual to each spring and engaging the latter intermediate the ends of said springs operating to maintain the lower portions of said springs under compression relative to the upper portions thereof, in the normal condition of the structure and presenting in the spring structure a zone at the upper portions of the springs in which a relatively soft spring action is afforded and a zone at the lower portions of said springs in which a relatively stiffer spring action is afforded, the normally compressed portions of said springs being operative independently of each other.

2. In a spring structure, the combination of a base section, a group of spiral springs connected with said section, and means, individual to each spring and engaging said base section and said springs intermediate the ends of the latter operating to maintain the lower portions of said springs under compression relative to the upper portions thereof, in the normal condition of the structure and presenting in the spring structure a zone at the upper portions of the springs in which a relatively soft spring action is afforded and a zone at the lower portions of said springs in which a relatively stiffer spring action is afforded, the normally compressed portions of said springs being operative independently of each other.

3. In a spring-structure, the combination of a group of spiral springs, and flexible means, individual to each spring and engaging said springs intermediate the ends of the latter operating to maintain the lower portions of said springs under compression relative to the upper portions thereof, in the normal condition of the structure and presenting in the spring-structure a zone at the upper portions of the springs in which a relatively soft spring action is afforded and a zone at the lower portions of said springs in which a relatively stiffer spring action is afforded, the normally compressed portions of said springs being operative independently of each other.

4. In a spring-structure, the combination of a base section, a group of spiral springs connected with said base section, and means, individual to each spring and engaging said base section and said springs intermediate the ends of the latter operating to maintain the lower portions of said springs under compression relative to the upper portions thereof, in the normal condition of the structure and presenting in the spring-structure a zone at the upper portions of the springs in which a relatively soft spring action is afforded and a zone at the lower portions of said springs in which a relatively stiffer spring action is afforded, the normally compressed portions of said springs being operative independently of each other.

OZELLO R. HUNT.